US006423806B1

United States Patent
Nakagawa et al.

(10) Patent No.: US 6,423,806 B1
(45) Date of Patent: Jul. 23, 2002

(54) ACRYLIC MONOMER COMPOSITION, ACRYLIC COPOLYMER, AND HEAT RESISTANT RESIN

(75) Inventors: Kouichi Nakagawa, Soraku-gun; Takehiko Morita, Ibaraki, both of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/397,847

(22) Filed: Sep. 17, 1999

(30) Foreign Application Priority Data

Sep. 18, 1998 (JP) .......................................... 10-265327

(51) Int. Cl.$^7$ ............................................. C08F 118/00
(52) U.S. Cl. ...................... 526/320; 526/324; 526/327; 526/328.5; 526/329; 526/329.2
(58) Field of Search ................................. 526/320, 324, 526/327, 328.5, 329, 329.2

(56) References Cited

U.S. PATENT DOCUMENTS

| 2,146,209 A | 2/1939 | Graves |
| 3,066,165 A | 11/1962 | Rosenthal et al. .......... 260/484 |
| 5,703,270 A | 12/1997 | Nakagawa et al. .......... 560/183 |

FOREIGN PATENT DOCUMENTS

| JP | 60-20905 | 2/1985 |
| JP | 9-241323 | 9/1997 |

OTHER PUBLICATIONS

"Post—Lactonization of Vinyl Polymers Containing Pendent Ester and Hydroxymethyl Groups" by J.A. Powell, et al., in *Polymer Preprints*, vol. 8, No. 11, pp. 576–581 (1967).
"Radical—Initiated Homopolymerization and Copolymerization of Ethyl α—Hydroxymethylacrylate" by M. Ueda, et al., in *Journal of Polymer Science: Part A: Polymer Chemistry*, vol. 27, pp. 751–762 (1989).
"Ethyl α—(Hydroxymethyl) acrylate (2–Propenoic acid, 2–(hydroxymethyl)–, ethyl ester)", by J. Villieras, et al., in *Org. Synth.*, 66, pp. 220–225, (1988).

"Copolymers of Styrene and Methyl α—(Hydroxymethyl) acrylate: Reactivity Ratios, Physical Behavior, and Spectral Properties", by A. O. Kress, et al, in *Macromolecules*, vol. 22, No. 2, pp. 537–546 (1989).
"Free–Radical Homopolymerization and Copolymerization of Ethyl α—Hydroxymethylacrylate in Tetrahydrofuran", M. C. Fernandez–Monreal, et al. Journal Polymer Science, Part A: Polymer Chemistry, vol. 30, No. 11, 1992, pp. 2313–2319, XP002148363. The complete document is provided.
"Thermal properties of ethyl.alpha.—hydroxymethyl acrylate–methyl methacrylate copolymers", Fernandez–Garcia, et al. Polymer (1994), 35(20). Abstract only is provided.

*Primary Examiner*—Helen L. Pezzuto
(74) *Attorney, Agent, or Firm*—David G. Conlin; John B. Alexander; Edwards & Angell, LLP

(57) ABSTRACT

A heat resistant resin is formed by heating an acrylic monomer composition prepared by copolymerising an acrylic monomer represented by general formula (1) with another monomer that is copolymerisable with the acrylic monomer, the acrylic monomer composition having an acid value of 5 mgKOH/g or less,

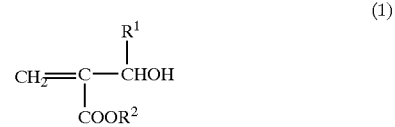

(1)

where each of $R^1$ and $R^2$ is either a hydrogen atom or an organic residue. A 1% tetrahydrofuran solution formed by subjecting the acrylic copolymer to a heat treatment at a temperature of 250° C. for 30 minutes and thereafter dissolving the acrylic copolymer in tetrahydrofuran has a viscosity ranging from 10 cps to 10,000 cps at 25° C. The acrylic polymer does not gel in the manufacture of a heat resistant resin, and by using the acrylic polymer as a material for a heat resistant resin, the resultant heat resistant resin obtained boasts excellent transparency and mouldability, and can be moulded by melting.

6 Claims, No Drawings

ACRYLIC MONOMER COMPOSITION, ACRYLIC COPOLYMER, AND HEAT RESISTANT RESIN

FIELD OF THE INVENTION

The present invention relates to an acrylic monomer composition and an acrylic copolymer that serve suitably as materials for highly transparent and mouldable heat resistant resins, and a heat resistant resin using such an acrylic copolymer.

BACKGROUND OF THE INVENTION

Methacrylic resins have found widespread applications for optics associated use in automobiles, home electric appliances, and the like, since they are highly colourless and transparent, glossy on surface, and durable in tough climates, as well as well-balanced in mechanical properties, thermal properties, surface hardness, and mouldability.

Recently, in these applications, the light sources are very often configured in a close proximity of the resin for better flexibility in design, smaller size, and higher performance. Hence, heat resistant resins that boast even better thermoresistance are earnestly desired.

A well-known method of preparing a heat resistant resin involves, for example, a technique to improve thermoresistance by crosslinking a copolymer of methyl methacrylate (MMA) and a multifunctional methacrylate such as neopenthyl glycol dimethacrylate. However, the resin prepared by that method boasts better a thermoresistance but has a low polymer fluidity when heated and poor mouldability.

Other well-known methods involves a technique to improve thermoresistance by side chains that are introduced by copolymerising MMA with an α-methyl styrene or with a maleic anhydride or with an ester methacrylate having a bulky alkyl group such as bornyl methacrylate. The method, although effectively improving thermoresistance by the introduction of bulky side chains, entails poor mechanical strength of the resin.

Further well-known methods involves a technique to improve thermoresistance by improving rigidness of the principal chain by a cyclic structure introduced to a principal chain by copolymerising MMA with a cyclic monomer such as an N-substituted maleimide and a maleic anhydride. The technique to introduce a cyclic structure to a principal chain have advantages, in comparison with the technique to introduce bulky side chains, that thermoresistance is greatly improved for a relatively small drop in mechanical strength. However, cyclic monomers are generally not well copolymerised with MMA, limited in capability to have thermoresistance imparting constituent introduced, and are likely to remain as an unreacted monomer when the polymerisation is completed. The unreacted residue in a polymer formed of cyclic monomers causes colouring and degradation in weatherability and other properties when the polymer is moulded into a moulded product.

Accordingly, a U.S. Pat. No. 2,146,209 discloses, as a technique to introduce a cyclic structure to a principal chain, a technique to introduce a six-memberedring imide structure (glutaric imide cyclic structure) to a principal chain by reacting polymethyl methacrylate (PMMA) with a primary alkyl amine. Further, Japanese Laid-Open Patent Application No. 60-20905/1985 (Tokukaisho 60-20905, published on Feb. 2, 1985) discloses a technique to introduce a glutaric anhydride structure to a principal chain by subjecting a copolymer of MMA with either a methacrylic acid or a methacrylic acid t-butyl ester to a heating treatment. The introduction of a six-membered cyclic structure to a principal chain by means of the aforementioned side chain reaction improves thermoresistance, as well as imparts a better performance in mechanical strength than methacrylic resins. However, the introduction of a six-membered ring imide structure causes colouring due to a nitrogen atom in unreacted free amine and the like when a copolymer having the structure is moulded. Further, the copolymer formed by introducing a glutaric anhydride structure is highly reactable with water, alcohol, and amine, the cycle thereof is easy to break, and therefore thermoresistance is not effectively improved.

Accordingly, as a method of preparing a heat resistant resin that is free from the preceding problems, Polym. Prepr., 8,11,576(1967), J. Polym. Sci., A., 27,751(1989) discloses a method of obtaining a heat resistant resin by subjecting a copolymer of styrene and a 2-(hydroxymethyl) acrylate alkyl ester to a heating treatment and thus lactone cyclising the copolymer. However, the method described in the document has a problem that part of the polymer is crosslinked and cannot be moulded by melting to prepare a heat resistant resin.

Accordingly, Japanese Laid-Open Patent Application No. 9-241323/1997 (Tokukaihei 9-241323, published on Sep. 16, 1997) discloses a technique to prevent polymer crosslinking in the heating treatment and resultant lactone cyclisation of a copolymer that has a structural unit derived from 2-(hydroxymethyl)acrylate alkyl ester, by subjecting the copolymer to a heating treatment in the presence of an esterificating catalyst or of a solvent.

However, the technique is still not able to prevent crosslinking to satisfactory levels. The heat resistant resin obtained by the method has problems when applied in a field where a higher degree of transparency and mouldability is required. Moreover, in manufacture of a heat resistant resin by subjecting a copolymer having a structural unit derived from 2-(hydroxymethyl) acrylate alkyl ester to a heating treatment, gelation becomes apparent only after the obtained polymer is actually subjected to a heating treatment to manufacture a heat resistant resin, and therefore if gelation should occur, significant amounts of time, cost, and labour are wasted in the removal of resultant gel products and cleaning of apparatus.

SUMMARY OF THE INVENTION

In light of the above problems, the present invention has an object to offer a highly transparent and mouldable, gelation-free heat resistant resin, as well as an acrylic monomer composition and an acrylic copolymer that can be used suitably as materials to manufacture the heat resistant resin.

In order to achieve the above object, the inventors of the present invention have diligently worked and found that an acrylic copolymer formed by copolymerising an acrylic monomer having a specific structure with another monomer that is copolymerisable with the acrylic monomer, either the acrylic copolymer having a specified acid value or the viscosity of a tetrahydrofuran solution dissolving the acrylic copolymer under a specified condition having a specified viscosity, is suitable as a material to manufacture a highly transparent and mouldable heat resistant resin that does not gel when manufactured, and also found that the acrylic copolymer having the specified acid value can be readily prepared by regulating the acid value of the monomer composition that contains the acrylic monomer having a specific structure and another monomer that is copolymerisable with the acrylic monomer, which led to the completion of the present invention.

Specifically, the acrylic monomer composition in accordance with the present invention, in order to solve the aforementioned problems, is an acrylic monomer composition containing an acrylic monomer represented by general formula (1)

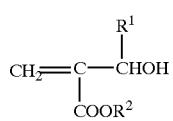

where each of $R^1$ and $R^2$ is either a hydrogen atom or an organic residue, and another monomer that is copolymerisable with the acrylic monomer, and is characterised in that it has an acid value of 5 mgKOH/g or less.

Further, the acrylic copolymer in accordance with the present invention, in order to solve the aforementioned problems, is an acrylic copolymer formed by copolymerising an acrylic monomer represented by general formula (1) with another monomer that is copolymerisable with the acrylic monomer, and is characterised in that it has an acid value of 5 mgKOH/g or less.

Moreover, the acrylic copolymer in accordance with the present invention, in order to solve the aforementioned problems, is an acrylic copolymer formed by copolymerising an acrylic monomer represented by general formula (1) with another monomer that is copolymerisable with the acrylic monomer, and is characterised in that the 1% tetrahydrofuran solution formed by subjecting the acrylic copolymer to a heating treatment at a temperature of 250° C. for 30 minutes and thereafter dissolving the acrylic copolymer in tetrahydrofuran has a viscosity ranging from 10 cps to 10,000 cps at 25° C.

The heat resistant resin in accordance with the present invention, in order to solve the aforementioned problems, is characterised in that it is formed by heating the acrylic copolymer.

Further, the method of preparing the acrylic copolymer in accordance with the present invention, in order to solve the aforementioned problems, is characterised in that the acrylic monomer composition is polymerised.

According to the present invention, a highly transparent and mouldable heat resistant resin that does not gel when manufactured can be offered by using, as a material for heat resistant resin, an acrylic copolymer formed by copolymerising an acrylic monomer represented by general formula (1) with another monomer that is copolymerisable with the acrylic monomer, the 1% tetrahydrofuran solution formed by subjecting the acrylic copolymer to a heating treatment at a temperature of 250° C. for 30 minutes and thereafter dissolving the acrylic copolymer in tetrahydrofuran having a viscosity ranging from 10 cps to 10,000 cps at 25° C. The a heat resistant resin is readily obtained by heating the acrylic copolymer.

Especially, an acrylic copolymer formed by copolymerising an acrylic monomer represented by general formula (1) with another monomer that is copolymerisable with the acrylic monomer, and having an acid value of 5 mgKOH/g or less meets the above regulation on viscosity at a temperature of 25° C., if being subjected to a heating treatment at a temperature of 250° C. for 30 minutes and thereafter dissolved in tetrahydrofuran to produce a 1% tetrahydrofuran solution. Besides, from that acrylic copolymer is obtainable a highly transparent and mouldable heat resistant resin that does not gel when manufactured and that can be moulded by melting. Further, if the acrylic copolymer is used, a heat resistant resin is obtainable which readily lactone cyclises and boasts excellent thermoresistance among various properties.

Further, if an acrylic monomer composition is used, the acrylic monomer composition containing an acrylic monomer represented by general formula (1) and another monomer that is copolymerisable with the acrylic monomer, and having an acid value of 5 mgKOH/g or less, the aforementioned acrylic polymer having an acid value of 5 mgKOH/g or less is readily obtained.

Therefore, if the aforementioned acrylic monomer composition is used, the acrylic polymer having an acid value of 5 mgKOH/g or less and the acrylic polymer of which the 1% THF solution has a viscosity of 10 cps to 10,000 cps at a temperature of 25 ° C. can be readily obtained.

The following description will discuss further details in accordance wit the present invention.

The acrylic copolymer in accordance with the present invention is a copolymer formed by polymerising an acrylic monomer composition containing an acrylic monomer represented by general formula (1) and another monomer that is copolymerisable with the acrylic monomer, and has an acid value of 5 mgKOH/g or less.

The acrylic monomer represented by general formula (1), used as a material in the method of preparing the acrylic copolymer, although not being limited in any special manner, is preferably a hydroxyl group containing monomer such that in the formula each of the substitution groups represented by $R^1$ and $R^2$ is either a hydrogen atom or an organic residue.

Specific examples of the organic residue that in some cases makes up the substitution groups represented by $R^1$ and $R^2$ include a linear or branched alkyl group having one to 18, preferably one to 12, carbons, such as a methyl group, an ethyl group, an N-propyl group, an iso-propyl group, an N-butyl group, a sec-butyl group, an N-hexyl group, a cyclohexyl group, an N-octyl group; a 2-ethylhexyl group, or a lauryl group; a non-substituted or substituted aryl group, having preferably six to 12 carbons, such as a phenyl group, a toluic group, a xylyl group, a naphthalene group, and a benzyl group; a hydroxy alkyl group having one to six carbons, such as a hydroxy methyl group, a 2-hydroxy ethyl group, a 2-hydroxy propyl group, a 3-hydroxy propyl group, a 4-hydroxy butyl group, and a 6-hydroxy hexyl group; and a heterocyclic group. Note that the substitution group represented $R^1$ is a substitution group derived from an aldehydric compound.

Specific examples of the acrylic monomer represented by general formula (1) include methyl-2-(hydroxymethyl) acrylate, ethyl-2-(hydroxymethyl) acrylate, isopropyl-2-(hydroxymethyl) acrylate, N-butyl-2-(hydroxymethyl) acrylate, and t-butyl-2-(hydroxymethyl) acrylate.

Any one of these acrylic monomers may be used alone, or alternatively, a plurality of them may be used in combination. Among the acrylic monomers mentioned above, methyl-2- (hydroxymethyl) acrylate and ethyl-2- (hydroxymethyl) acrylate are especially preferred since a desired acrylic copolymer is readily obtainable from them.

The above acrylic monomers used in accordance with the present invention are readily obtainable by a well-known method: for example, a method of carbonylation and subsequent esterification of propargyl alcohol (U.S. Pat. No. 3,066,165), a method of reaction (Wittig-Horner Reaction) of trialkyl phosphonoacetate with formalin in the presence of potassium hydroxide (Org. Synth., 66,220 (1988)) a method of reacting associated vinyl with aldehydric compounds in the presence of a tertiary amine compound as a catalyst and in the presence of water (Japanese Laid-Open Patent Application No.7-285906/1995 (Tokukaihei 7-285906, published on Oct. 31, 1995; Corresponding U.S. Pat. No. 5,703,270)), or a method of subjecting an acrylic monomer obtained with one of these methods to a cleaning treatment with a basic substance. Note that the cleaning treatment will be detailed later.

The monomer that is copolymerisable with the acrylic monomer represented by general formula (1) (hereinafter, in some cases will be referred to as a copolymerisation constituent), although not being limited in any special manner, is suitably a vinyl monomer represented by general formula (2) due to good reaction and polymerisation properties with the acrylic monomer represented by general formula (1) and ready obtainability of a desired heat resistant resin:

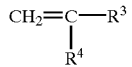

(2)

where $R^3$ is either a hydrogen atom or a methyl group, $R^4$ is a hydrogen atom, an alkyl group having one to six carbons, a phenyl group, an —$OCOCH_3$ group, a —CN group, a —$COR^5$ group, or a —$COOR^6$ group, and each of $R^5$ and $R^6$ is either a hydrogen atom or an organic residue.

The vinyl monomer represented by general formula (2), although not being limited in any special manner, is a vinyl monomer where the substitution group $R^3$ is either a hydrogen atom or a methyl group, the substitution group $R^4$ is a hydrogen atom, an alkyl group having one to six carbons, a phenyl group, an —$OCOCH_3$ group, a —CN group, a —$COR^5$ group, or a —$COOR^6$ group, and each of $R^5$ and $R^6$ is either a hydrogen atom or an organic residue. The organic residue, as the substitution groups $R^5$ and $R^6$, is specifically an alkyl group having one to 18, an aryl group, a hydroxy alkyl group having one to six carbons having one to six carbons, or a heterocyclic group.

Examples of the vinyl monomer represented by general formula (2) include methyl (meth)acrylate, ethyl (meth)acrylate, cyclo hexyl (meth)acrylate, styrene, α-methyl styrene, acrylonitrile, methyl vinyl ketone, ethylene, propylene, vinyl acetate.

Further, apart from the vinyl monomer represented by general formula (2), specific examples of the copolymerisation constituent, although not being limited in any special manner, include halogenated vinyls, such as vinyl chloride, and chloride vinylidene; maleimides, such as maleimide, N-phenyl maleimide, N-cyclohexyl maleimide, N-benzyl maleimide, N-isopropyl maleimide, N-(2-chlorophenyl) maleimide, and N-(2-bromophenyl) maleimide; a maleic anhydride; maleates, such as maleic acid dicyclohexyl; fumarates, such as fumaric acid dibutyl and fumaric acid dicyclohexyl; α-methylene-γ-butyrolactone.

Any one of these copolymerisation constituents may be used alone, or alternatively, a plurality of them may be used in combination. Among the monomers mentioned above, methyl methacrylate, methacrylic acid cyclohexyl, and styrene are especially suitably used.

The acrylic copolymer in accordance with the present invention can be readily manufactured by copolymerising the acrylic monomer represented by general formula (1) with the monomer (a copolymerisation constituent) that is copolymerisable with the acrylic monomer.

The acid value of the acrylic copolymer is adjustable by adding a basic compound that does not cause colouring and other problems in manufacture of a heat resistant resin: for example, sodium carbonate, sodium hydrogencarbonate, sodium acetate, potassium acetate, sodium acrylate, sodium methacrylate. An acid value of 5 mgKOH/g or less can be imparted to the acrylic copolymer by causing a polymerisation reaction of an acrylic monomer composition having an acid value of 5 mgKOH/g or less that contains the acrylic monomer represented by general formula (1) and the monomer that is copolymerisable with that acrylic monomer (copolymerisation constituent), preferably the vinyl monomer represented by general formula (2).

If the acrylic copolymer has an acid value of 5 mgKOH/g or less, the resultant heat resistant resin readily lactone cyclises, boasts excellent thermoresistance, transparency and mouldability, does not gel when manufactured, and can be moulded by melting. By contrast, if the acrylic copolymer has an acid value exceeding 5 mgKOH/g, the resultant heat resistant resin gels when manufactured and has problems in transparency, mouldability, etc.

The acrylic monomer represented by general formula (1) and the monomer that is copolymerisable with that acrylic monomer (copolymerisation constituent) are mixed to form the acrylic monomer composition, at a mixture ratio appropriately specified depending on properties desirably imparted to the heat resistant resin, the constituents of the acrylic monomer composition to be used, and the like.

For example, the mixture ratio of the acrylic monomer represented by general formula (1) and its copolymerisation constituent in the acrylic monomer composition, i.e., the ratio of the acrylic monomer represented by general formula (1) to the copolymerisation constituent, is preferably in a rage from 1:9 to 7:3.

If the mixture ratio of the acrylic monomer represented by general formula (1) in the acrylic monomer composition is lower than the preceding mixture ratio, the resultant heat resistant resin possibly does not have excellent thermoresistance. By contrast, if the mixture ratio of the acrylic monomer represented by general formula (1) in the acrylic monomer composition is higher than the mixture ratio, the resultant heat resistant resin has improved thermoresistance, but the improvement in thermoresistance is not so effective to match the increase in the mixture ratio, which is not economically favourable.

Further, if the acrylic monomer composition does not contain a copolymerisation constituent, i.e., if the acrylic polymer obtained is a homopolymer of the acrylic monomer represented by general formula (1), the resultant acrylic polymer gels when manufactured even with an acid value being 5 mgKOH/g or less, and the obtained heat resistant resin undesirably lacks excellent transparency and mouldability.

In summary, the acrylic copolymer in accordance with the present invention is readily obtained by preparing the acrylic monomer composition containing an acrylic monomer represented by general formula (1) and another monomer that is copolymerisable with the acrylic monomer (copolymerisation constituent) so that the acrylic monomer composition obtained has an acid value of 5 mgKOH/g or less, and thereafter causing a polymerisation reaction of the acrylic monomer composition.

The method of preparing the acrylic monomer composition is not limited in any special manner. Examples of such a method include a method of subjecting a monomer composition containing an acrylic monomer and another monomer that is copolymerisable with the acrylic monomer with a basic substance to a cleaning treatment, the acrylic monomer being the acrylic monomer represented by general formula (1) or a monomer that, if subjected to a cleaning treatment with a basic substance, produces the acrylic monomer represented by general formula (1), specifically an acrylic monomer that is obtainable by either of the manufacturing methods disclosed or described in U.S. Pat. No. 3,066,165, Org. Synth.,66,220(1988), and Japanese Laid-Open Patent Application No. 7-285906 (Tokukaihei 7-285906); and a method of adjusting the acid value of the individual monomer constituent constituting the acrylic monomer composition to 5 mgKOH/g or less in advance by a cleaning treatment with a basic substance.

The basic substance used in the cleaning treatment is not limited in any special manner: specific examples include a basic ion-exchange resin, sodium hydrogencarbonate, and sodium hydroxide. Specific examples of the basic ion-exchange resin include basic ion-exchange resins available from Rohm & Haas Co., such as Amberlight A-21, Amberlight IRA-68, Amberlight IRA-60E, Amberlight IRA-35, and Amberlight IRA-45; basic ion-exchange resins available from Mitsubishi Chemical Industries Ltd., such as Diaion WA-10, Diaion WA-20, and Diaion WA-30; basic ion-exchange resins available from Dow Chemicals Co., such as Dowex WGR2, and Dowex 66; and basic ion-exchange resins available from Sumitomo Chemical Co., Ltd., such as Duolite A-368, and Duolite A-568, Duolite A-578. Among these basic substances, basic ion-exchange resins are suitable for use.

An example of the cleaning treatment method is to stir the material subjected to a cleaning treatment together with a basic substance in the presence of water and/or an organic solvent as required, and thereafter fractionate the obtained product. The material having been subjected to a cleaning treatment may be directly used as a material for an acrylic copolymer, but is preferably further distilled after the cleaning treatment for some usages.

The polymerisation reaction of the acrylic monomer composition, i.e., the copolymerisation reaction of the acrylic monomer represented by general formula (1) with the monomer that is copolymerisable with the acrylic monomer can be readily caused by radical polymerisation reaction, ionic polymerisation reaction, and the like. However, preferably, radical polymerisation reaction is employed. Further, for the radical polymerisation reaction, various prior art methods may be employed: for example, a bulk polymerisation technique, a solution polymerisation technique, and a suspension polymerisation technique. A solution polymerisation technique is especially suitable for use due to easy control of polymerisation reaction.

The radical polymerisation initiator used for the radical polymerisation reaction is not limited in any special manner: examples include azo polymerisation initiators, such as azobis isobutyronitrile, and peroxide polymerisation initiator, such as a benzoyl peroxide.

Further, the quantity of the polymerisation initiator used, polymerisation time, polymerisation temperature, and other reaction conditions are not limited in any special manner, but appropriately specified according to the polymerisation initiator used, constituents of the acrylic monomer composition, and polymerisation system. Note that the polymerisation reaction is preferably caused under a nitrogen or other inert gas atmosphere The acrylic copolymer obtained preferably has a degree of polymerisation such that the weight-average molecular weight is in a range from 5,000 to 1,000,000, and preferably from 10,000 to 500,000. If the weight-average molecular weight is less than 5,000, it is difficult to maintain mechanical properties over a long period of time, and poses problems for long term uses. Further, if the weight-average molecular weight exceeds 1,000,000, the improvement in performance is not so effective to match the labour, manufacturing costs, manufacture conditions, etc. required to obtain an acrylic copolymer that exceeds 1,000,000 in weight-average molecular weight, which is not economically favourable.

Further, in the polymerisation reaction, in order to adjust the weight-average molecular weight, a chain transfer agent, such as methyl mercapt propionic acid or dodecyl mercaptan, may be added as required.

The acrylic copolymer in accordance with the present invention is obtainable by, for example, adding a radical polymerisation initiator at a ratio of 0.1 percent by weight to 5 percent by weight to the quantity of the acrylic monomer composition, i.e., the total amount of the acrylic monomer represented by general formula (1) and the monomer that is copolymerisable with the acrylic monomer in the presence of an organic solvent that is inert to the polymerisation reaction, causing a polymerisation reaction at a polymerisation temperature of 60° C. to 150° C. for one to 10 hours, removing the organic solvent used for the polymerisation reaction, and letting the obtained copolymer settle in a poor solvent to remove residual monomer.

The acrylic monomer composition in accordance with the present invention, if used as a material, can normally produce an acrylic copolymer having an acid value 5 mgKOH/g or less from the polymerisation reaction. The aforementioned basic compound that does not cause colouring and other problems in manufacture of a heat resistant resin may be added so as to adjust the acid value of the acrylic copolymer.

The heat resistant resin in accordance with the present invention is readily obtainable by heating the acrylic copolymer and removing volatile constituent. In the present invention, a heat resistant resin refers to a resin, with improved thermoresistance in comparison to a base resin, obtained by copolymerising the aforementioned copolymerisation constituent (another monomer) with a specific monomer constituent and, if necessary, introducing a specific structure or function group (consequently to the base resin), where the base resin is defined as a resin formed from the polymerisation of the aforementioned copolymerisation constituent (another monomer). The heat resistant resin in accordance with the present invention, if an acrylic copolymer with a regulated acid value is used as the material therefor, does not gel, boasts excellent transparency and mouldability, and is capable of being moulded by melting.

However, typically, gelation becomes apparent only after a polymer as a material to produce a heat resistant resin is subjected to a heating treatment to manufacture the heat resistant resin, and therefore if gelation should occur, significant amounts of time, cost and labour are wasted in the removal of resultant gel products and cleaning of apparatus.

For these reasons, the ability to know possibilities of gelation occurring for certain is very important in industrial use. Therefore, by confirming the possibility in advance before manufacture of a heat resistant resin, the resultant heat resistant resin does not gel during manufacture, and is readily given highly transparent, mouldable features.

Accordingly, the inventors of the present invention have diligently worked on conditions under which the heat resistant resin does not gel when manufactured, and found that if an acrylic copolymer is formed by copolymerising an acrylic monomer represented by general formula (1) with another monomer that is copolymerisable with the acrylic monomer, or preferably with a vinyl monomer represented by general formula (2), subjected to a heating treatment for 30 minutes at a temperature of 250° C., and dissolved in THF to produce a 1% THF solution having a viscosity ranging from 10 cps to 10,000 cps at 25° C., the resultant heat resistant resin does not gel during manufacture, and is given highly transparent, mouldable features.

The inventors of the present invention have further found that the acrylic copolymer formed by copolymerising an acrylic monomer represented by general formula (1) with another monomer that is copolymerisable with the acrylic monomer, and having an acid value of 5 mgKOH/g or less satisfies those conditions.

Accordingly, with those findings in mind, it could be understood that if a gelation test is conducted as a preparatory test before the manufacture of a heat resistant resin, so as to estimate gelation by measuring the viscosity of a 1% THF solution formed by dissolving the resultant acrylic copolymer at 25° C., and according to test results only the acrylic copolymer of which the 1% THF solution has a viscosity ranging from 10 cps to 10,000 cps at a temperature of 25° C. is selectively used as a material for heat resistant resin, it is possible to prevent production of gel products in the manufacture of a heat resistant resin, and to stably obtain a highly transparent, mouldable heat resistant resin. Further, by conducting the gelation test as a preparatory test before the manufacture of a heat resistant resin, it can be quickly estimated whether or not gelation occurs during the manufacture of a heat resistant resin.

The gelation test is, specifically, conducted by the following scheme. First, 10 g of an acrylic copolymer obtained is taken on an aluminum plate, placed in a thermostatic tank that is set to a temperature of 250° C. in advance, and subjected to a heating treatment for 30 minutes. Next, 1 g of the acrylic copolymer treated with heat is taken and dissolved in 99 g of THF to prepare a 1% THF solution, and 1 cc of the 1% THF solution is measured for viscosity at a temperature of 25° C. using an E-type viscosity meter (a VICONIED type available from Tokyo Keiki Co. Ltd.) with the rotor set to 0.8°.

Further, since the acrylic monomer represented by general formula (1) is an acrylic monomer having reactive hydroxyl groups, if the ratio of the acrylic monomer is too high in polymerisation reaction, gelation becomes likely to occur from partial crosslinking in the manufacture of a heat resistant resin. Therefore, if the acid value is not adjust to the specified range, precise control of polymerise conditions is essential, resulting in a more complex operation. Accordingly, by conducting a gelation test and obtaining such polymerisation reaction conditions that the viscosity of a 1% THF solution at a temperature of 25° C. satisfies the regulations in the gelation test, the resultant acrylic copolymer becomes suitable as a material for a heat resistant resin that does not gel during manufacture, and that has high transparency and mouldability. In other words, in order to obtain an acrylic copolymer suitable as a material for a heat resistant resin that has excellent transparency and mouldability, an acrylic monomer represented by general formula (1) and another monomer that is copolymerisable with the acrylic monomer should be copolymerised under such polymerisation reaction conditions that the viscosity of a 1% THF solution at a temperature of 25° C. satisfies the regulations in the gelation test.

The heating device used in the heating treatment of the acrylic polymer in accordance with the present invention to manufacture the heat resistant resin is not limited in any special manner as long as the heating device is capable of heating the acrylic polymer and removing the volatile constituent thereof. However, the heating device is preferably a heating furnace, a pushing device, or the like that has, for example, a vacuum creating function to remove the volatile constituents.

The heating temperature of the heating treatment, although not being limited in any special manner, is preferably in a range from 150° C. to 350° C., and more preferably from 200° C. to 350° C.

The heating time of the heating treatment is specified as required by the degree of thermoresistance and the like, and not limited in any special manner. However, the heating time typically is in a range from one to five hours.

Further, in the heating treatment, protonic acids, such as acetate, oxalic acid, and maleic acid; phosphonium salts, such as bromotetramethyl phosphonium, bromotetraethyl phosphonium, bromotetrabutyl phosphonium, and bromotetrabutyl triphenyl phosphonium. By adding these compounds, the heat resistant resin can be effectively manufacture as desired even at low heating temperatures.

As detailed above, the acrylic polymer in accordance with the present invention is a copolymer formed by copolymerising an acrylic monomer represented by general formula (1) with another monomer that is copolymerisable with the acrylic monomer, or preferably with a vinyl monomer represented by general formula (2), and can be used suitably as a material for a highly transparent and mouldable heat resistant resin that does not gel when manufactured if regulations are met in the gelation test that the viscosity of a 1% THF solution at a temperature of 25° C. is in a range from 10 cps to 10,000 cps.

Further, the acrylic polymer formed by copolymerising an acrylic monomer represented by general formula (1) with another monomer that is copolymerisable with the acrylic monomer, or preferably with a vinyl monomer represented by general formula (2), that has an acid value of 5 mgKOH/g or less, is such that the viscosity of a 1% THF solution at a temperature of 25° C. satisfies the specified range in a gelation test, does not gel in the manufacture of a heat resistant resin, and produces a heat resistant resin, with excellent transparency and mouldability, that can be moulded by melting. The acrylic polymer is readily lactone cyclised, and a heat resistant resin that boasts excellent thermoresistance among various features can be prepared from the acrylic polymer.

Further, an acrylic monomer composition containing a acrylic monomer represented by general formula (1) and another monomer that is copolymerisable with the acrylic monomer, as well as having an acid value of 5 mgKOH/g or less, is suitable as a material for an acrylic polymer having an acid value of 5 mgKOH/g or less. Therefore, the acrylic monomer composition can be suitably used as a material for an acrylic polymer having an acid value of 5 mgKOH/g or less, and also as a material for an acrylic polymer such that the viscosity of a 1% THF solution at a temperature of 25° C. is in a range from 10 cps to 10,000 cps in a gelation test.

The heat resistant resin prepared in accordance with the present invention does not gel, boasts excellent transparency and mouldability, can be used in a wide variety of usage that requires thermoresistance.

For a fuller understanding of the nature and advantages of the invention, reference should be made to the ensuing detailed description taken in conjunction with the accompanying drawings.

DESCRIPTION OF THE EMBODIMENTS

The present invention will become more fully understood from the detailed description given hereinbelow which are given by way of illustration only, are not in any way intended to limit the scope of the claims of the present invention.

In the embodiments and comparative examples, the acid values of the acrylic monomer composition and acrylic polymer obtained were measured in mgKOH/g by dissolving 1 g of a sample in 20 ml of dioxane, stirring the sample dissolved solution at room temperature for 5 hours, and titrating a 0.05 N potassium hydroxide-ethanol solution to neutralise the sample dissolved solution. Further, thermoresistance of the heat resistant resin obtained was estimated at glass transition temperature.

The acrylic monomer in the acrylic monomer composition was manufactured according to manufacturing examples below. Further, the substance (acrylic monomer) obtained was identified by measuring $^1$H-NMR, $^{13}$C-NMR, and infrared absorption spectrum (IR).

Manufacturing Example 1

In the present manufacturing example, methyl-2-(hydroxymethyl) acrylate was prepared as an acrylate monomer based on Org. Synth., 66.220 (1988). First, 48 g of paraformaldehyde, 4 ml of 1N phosphoric acid, and 110 ml of pure water were introduced into a 1000 ml four-necked flask equipped with a stirring device, a thermometer, a condenser device, a titration funnel, etc., and then stirred at a temperature of 90° C. for 1.5 hours while heating, to prepare a transparent formalin aqueous solution. Next, the formalin aqueous solution was cooled down to room temperature. The formalin aqueous solution was then stirred at room temperature at 100 rpm after adding 72.8 g of trimethyl phosphonoacetate thereto.

Meanwhile, 60.7 g of potassium carbonate was dissolved in 60 ml of pure water, and this potassium carbonate aqueous solution was introduced into a titration funnel. Next, the potassium carbonate aqueous solution was gradually titrated into the flask and stirred to cause reaction while maintaining the temperature of the reaction liquid in the flask at 35° C. to 40° C.

After completion of dropping, the reaction liquid was stirred further for 5 minutes at a temperature of 40° C., and quickly cooled down to room temperature in an ice bath to terminate reaction. Thereafter, 200 ml of diethyl ether and 150 ml of saturated saline solution were added to the reaction liquid, which was then separated into an organic phase and an aqueous phase by filtering. Next, an extraction operation was carried out on the aqueous phase with ether being used as extractant, and then the extractant was added to the organic phase. Next, the organic phase was cleaned with a saturated saline solution, dried with magnesium sulfate, rid of the solvent at a reduced pressure with an evapourator, and subsequently distilled at a reduced pressure, to prepare colourless, transparent, liquid methyl-2-(hydroxymethyl) acrylate. The obtained methyl-2-(hydroxymethyl) acrylate had an acid value of 6.8 mgKOH/g.

Manufacturing Example 2

In the present manufacturing example, ethyl-2-(hydroxymethyl) acrylate was prepared as an acrylate monomer based on Japanese Laid-Open Patent Application No. 7-285906 (Tokukaihei 7-285906). First, 400 g of ethyl acrylate, 86 g of 35 percent by weight formaldehyde aqueous solution, 98 g of 30 percent by weight trimethyl amine aqueous solution, and 0.4 g of p-methoxy phenol were introduced into a 1000 ml four-necked flask equipped with a thermometer, a gas blowing pipe, a condenser pipe, a stirring device, and a water bath. Thereafter the reaction solution was reacted at a temperature of 60° C. for 3 hours by stirring while blowing air to the reaction solution.

After termination of reaction, the reaction solution was separated into an organic phase and an aqueous phase. Next, the organic phase was cleaned with a 1% sodium hydroxide aqueous solution, further cleaned with pure water, and subjected to a fractional distillation, prepare colourless, transparent liquid ethyl-2-(hydroxymethyl) acrylate which is a fraction of 73° C. to 76° C./5 mmHG. The obtained ethyl-2-(hydroxymethyl) acrylate had an acid value of 0.10 mgKOH/g.

Embodiment 1

First, 116 g of the methyl-2-(hydroxymethyl) acrylate prepared in manufacturing example 1 was dissolved in 300 g of pure water. Next, this aqueous solution was passed through a treatment tower having an inner diameter of 2 cm, that is filled with 300 ml of a basic ion-exchange resin "Amberlight IRA-45" available from Rohm & Haas Co. Subsequently, the treated liquid was rid of water at a reduced pressure of 30 mmHG with an evapourator, refined by vacuum distillation, to prepare colourless, transparent, liquid methyl-2-(hydroxymethyl) acrylate of 0.30 mgKOH/g in acid value.

Next, 35 parts of the methyl-2-(hydroxymethyl) acrylate and 65 parts of methyl methacrylate were mixed and dissolved to prepare an acrylate monomer composition. The acrylate monomer composition had an acid value of 0.1 mgKOH/g.

Next, 100 parts of the acrylate monomer composition, 100 parts of toluene as a solvent, and 1 part of benzoyl peroxide as a polymerisation initiator were simultaneously introduced into a 1000 ml four-necked flask equipped with a thermometer, a gas blowing pipe, a condenser pipe, a stirring device, and a water bath, and polymerised by stirring for 1 hour at a bath temperature of 120° C. Subsequently, this polymerised reaction liquid was cooled down to room temperature, and thereafter placed in methanol which was in excessive amount to the polymerised reaction liquid to precipitate the polymerised product, and the precipitate was filtered and thus separated. Next, the polymerised product prepared was dried at a reduced pressure at 80° C., to obtain an acrylic copolymer in accordance with the present invention in the form of white powder. The acrylic copolymer measured 160,000 in weight-average molecular weight with gel permeation chromatography (GPC), and 0.10 mgKOH/g in acid value.

Subsequently, to conduct a gelation test, 10 g of the acrylic copolymer was taken on an aluminum plate, and subjected to a heating treatment in a thermostatic tank at 250° C. for 30 minutes. Then 1 g of the heating treated acrylic copolymer was introduced and dissolved in a container containing 99 g of THF, and 1 cc was taken of this 1% THF solution of the acrylate copolymer, and measured for viscosity at 25° C. using an E-type viscosity meter (a VICONIED type available from Tokyo Keiki Co. Ltd.) with the rotor set to 0.8°. The measurement was 80 cps. Further, it was visually confirmed that no gel insoluble substance was contained in the 1% THF solution of the acrylic copolymer.

Then, the acrylic copolymer was placed in a test tube and subjected to a heating treatment at 200° C. for 120 minutes in a nitrogen gas flow, to prepare a denatured resin of the acrylic copolymer as a heat resistant resin in accordance with the present invention. The resin was meltable, and could be readily moulded into a colourless, transparent specimen at a mould temperature of 280° C. The glass transition temperature (Tg) of the resin was 140° C.

Embodiment 2

The same reactions and operations were done as in the embodiment 1, except that 60 parts of the ethyl-2-(hydroxymethyl) acrylate obtained in manufacturing example 2 was used in place of 35 parts of methyl-2-(hydroxymethyl) acrylate having an acid value of 0.30 mgKOH/g, and 40 parts, instead of 65 parts, of methyl methacrylate was used. The acid value of the acrylic monomer composition was adjusted in advance to 0.18 mgKOH. Further, with GPC, the weight-average molecular weight of the acrylic copolymer measured 104,000, and the acid value measured 0.17 mgKOH/g.

Subsequently, the same gelation test as in embodiment 1 was conducted using the acrylic copolymer, and a 1% THF solution of the acrylic copolymer was measured for viscosity at 25° C. The measurement was 230 cps. Further, it was visually confirmed that no gel insoluble substance was contained in the 1% THF solution of the acrylic copolymer.

Then, the acrylic copolymer was placed in a test tube, and subjected to a heating treatment at 200° C. for 90 minutes in a nitrogen gas flow, to prepare a denatured resin of the acrylic copolymer as a heat resistant resin in accordance with the present invention. The resin was meltable, and could be readily moulded into a colourless, transparent specimen at a mould temperature of 280° C. The glass transition temperature (Tg) of the resin was 152° C.

Comparative Example 1

The same reactions and operations were done as in the embodiment 1, except that 80 parts of methyl-2-(hydroxymethyl) acrylate having an acid value of 6.80 mgKOH/g that was obtained in manufacturing example 1 was used in place of 35 parts of methyl-2-(hydroxymethyl) acrylate having an acid value of 0.30 mgKOH/g, and 20 parts, instead of 65 parts, of methyl methacrylate was used. The acid value of the acrylic monomer composition was adjusted in advance to 5.55 mgKOH. Further, with GPC, the weight-average molecular weight of the acrylic copolymer measured 152,000, and the acid value measured 5.75 mgKOH/g.

Subsequently, to conduct a gelation test, 10 g of the acrylic copolymer was taken on an aluminum plate, and subjected to a heating treatment in a thermostatic tank at 250° C. for 30 minutes. Then 1 g of the heating treated acrylic copolymer was introduced and dissolved in a container containing 99 g of THF, and stirred; however, gelation occurred and insoluble substance was discovered. The acrylic polymer did not dissolve completely. Viscosity of a solution therefore could not be measured.

Subsequently, the acrylic copolymer was placed in a test tube, and subjected to a heating treatment at 200° C. for 90 minutes in a nitrogen gas flow, to prepare a denatured resin of the acrylic copolymer as a comparative heat resistant resin. The resin, although being colourless and transparent, was not meltable, and became a lump of unmeltable, foamy resin at a mould temperature of 280° C.

Comparative Example 2

100 parts of ethyl-2-(hydroxymethyl) acrylate obtained in manufacturing example 2 that had an acid value of 0.10 mgKOH/g, 100 parts of THF as a solvent, and 1 part of benzoyl peroxide as a polymerisation initiator were simultaneously introduced in a four-necked flask similar to that used in embodiment 1, and polymerised by stirring for 1 hour at a bath temperature of 120° C. Subsequently, this polymerised reaction liquid was cooled down to room temperature, and thereafter placed in n-hexane which was in excessive amount to the polymerised reaction liquid to precipitate the polymerised product, and the precipitate was fractionated by filtering and then dried, to prepare a comparative acrylic polymer in the form of white powder. With GPC, the weight-average molecular weight of the acrylic copolymer measured 210,000, and the acid value measured 0.12 mgKOH/g.

Subsequently, to conduct a gelation test, 10 g of the acrylic copolymer was taken on an aluminum plate, and subjected to a heating treatment in a thermostatic tank at 250° C. for 30 minutes. Then 1 g of the heating treated acrylic copolymer was introduced and dissolved in a container containing 99 g of THF, and stirred; however, gelation occurred and insoluble substance was discovered. The acrylic polymer did not dissolve completely. viscosity of a solution therefore could not be measured.

Further, the acrylic copolymer was placed in a test tube, and subjected to a heating treatment at 200° C. for 90 minutes in a nitrogen gas flow, to prepare a denatured resin of the acrylic copolymer as a comparative heat resistant resin. The resin, although being colourless and transparent, was not meltable, and became a lump of unmeltable, foamy resin at a mould temperature of 280° C.

It could be understood from embodiment 1 and embodiment 2 that the present invention is capable of preparing a heat resistant resin that does not gel, boasts excellent transparency, mouldability, and thermoresistance, and can be moulded by melting. It could be further understood that if the acrylic copolymer used as a material has an acid value exceeding 5 mgKOH/g as in comparative example 1, or if a homopolymer of an acrylic monomer is used as a material as in comparative example 2, gelation occurs in the manufacture of a heat resistant resin, and the resultant heat resistant resin does not have excellent mouldability.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An acrylic monomer composition, comprising:
    an acrylic monomer represented by general formula (1),

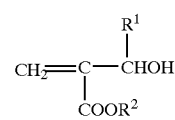

(1)

where each of $R^1$ and $R^2$ is either a hydrogen atom or an organic residue; and
another monomer that is copolymerisable with the acrylic monomer,
wherein said acrylic monomer composition has an acid value adjusted to 5 mgKOH/g or less by being cleaned thereof by a basic substance.

2. The acrylic monomer composition as defined in claim 1,
    wherein the monomer that is copolymerisable with the acrylic monomer is a vinyl monomer represented by general formula (2)

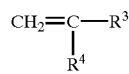

(2)

where $R^3$ is either a hydrogen atom or a methyl group, $R^4$ is a hydrogen atom, an alkyl group having one to six carbons, a phenyl group, an —$OCOCH_3$ group, a —CN group, a —$COR^5$ group, or a —$COOR6$ group, and each of $R^5$ and $R^6$ is either a hydrogen atom or an organic residue.

3. The acrylic monomer composition as defined in claim 1,
wherein in the acrylic monomer composition, the acrylic monomer represented by general formula (1) and the monomer that is copolymerisable with the acrylic monomer are mixed at a ratio ranging from 1:9 to 7:3.

4. An acrylic copolymer, being formed by copolymerising:

an acrylic monomer represented by general formula (1),

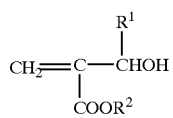

(1)

where each of $R^1$ and $R^2$ is either a hydrogen atom or an organic residue; and another monomer that is copolymerisable with the acrylic monomer, wherein said acrylic copolymer has an acid value which is adjusted to 5 mgKOH/g or less by adding basic compound thereto.

5. An acrylic copolymer, being formed by copolymerising:

an acrylic monomer represented by general formula (1),

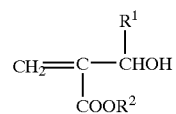

(1)

where each of $R^1$ and $R^2$ is either a hydrogen atom or an organic residue; and another monomer that is copolymerisable with the acrylic monomer, wherein a 1% tetrahydrofuran solution formed by subjecting said acrylic copolymer to a heating treatment at a temperature of 250° C. for 30 minutes in the absence of a solvent and thereafter dissolving said acrylic copolymer in tetrahydrofuran has a viscosity ranging from 10 cps to 10,000 cps at 25° C.

6. An acrylic copolymer, being formed by copolymerising:

an acrylic monomer represented by general formula (1),

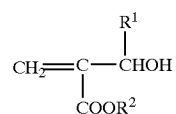

(1)

where each of $R^1$ and $R^2$ is either a hydrogen atom or an organic residue; and another monomer that is copolymerisable with the acrylic monomer, wherein said monomer composition has an acid value which is adjusted to be 5 mgKOH/g or less by being cleaned thereof with basic substance.

* * * * *